US012124221B2

(12) United States Patent
Franzi

(10) Patent No.: US 12,124,221 B2
(45) Date of Patent: Oct. 22, 2024

(54) ELECTRONIC WATCH COMPRISING A DEWAR DEVICE

(71) Applicant: OMEGA SA, Biel/Bienne (CH)

(72) Inventor: Edoardo Franzi, Cheseaux-Noréaz (CH)

(73) Assignee: OMEGA SA, Biel/Bienne (CH)

(*) Notice: Subject to any disclaimer, the term of this patent is extended or adjusted under 35 U.S.C. 154(b) by 247 days.

(21) Appl. No.: 17/782,699

(22) PCT Filed: Dec. 9, 2020

(86) PCT No.: PCT/EP2020/085357
§ 371 (c)(1),
(2) Date: Jun. 6, 2022

(87) PCT Pub. No.: WO2021/116217
PCT Pub. Date: Jun. 17, 2021

(65) Prior Publication Data

US 2023/0012346 A1 Jan. 12, 2023

(30) Foreign Application Priority Data

Dec. 9, 2019 (EP) ..................................... 19214449

(51) Int. Cl.

| | |
|---|---|
| ***G04B 37/02*** | (2006.01) |
| ***G04B 43/00*** | (2006.01) |
| ***G04G 17/04*** | (2006.01) |
| ***G04G 17/08*** | (2006.01) |

(52) U.S. Cl.
CPC ........... *G04B 37/02* (2013.01); *G04B 43/005* (2013.01); *G04G 17/04* (2013.01); *G04G 17/08* (2013.01)

(58) Field of Classification Search
CPC ...... G04B 37/02; G04B 43/005; G04B 37/22; G04G 17/04; G04G 17/08; G04G 17/02; G04G 17/083
See application file for complete search history.

(56) References Cited

U.S. PATENT DOCUMENTS 2,656,674 A * 10/1953 Bondy .................. G04B 37/02 368/291
3,030,763 A 6/1960 Klingenberg
(Continued)

FOREIGN PATENT DOCUMENTS

CN 203747909 U 7/2014
CN 106325041 A 1/2017
(Continued)

OTHER PUBLICATIONS

International Search Report of PCT/EP2020/085357 dated Mar. 5, 2021 [PCT/ISA/210].

*Primary Examiner* — Edwin A. Leon
(74) *Attorney, Agent, or Firm* — Sughrue Mion, PLLC

(57) ABSTRACT

There is provided an electronic watch including a bracelet and a watch case including at least one electrical or electronic component, the watch including at least one Dewar device configured to contain at least one of said electrical or electronic components, the at least one Dewar device including inner and outer walls and a vacuum or quasi-vacuum space defined between these said walls, the inner wall delimiting a volume wherein said at least one electrical or electronic component may be arranged.

12 Claims, 2 Drawing Sheets

(56) References Cited

U.S. PATENT DOCUMENTS

| | | | | | |
|---|---|---|---|---|---|
| 3,740,944 | A | * | 6/1973 | Chopard | G04B 43/005 368/286 |
| 4,080,781 | A | * | 3/1978 | Klingenberg | G04B 37/02 368/286 |
| 2012/0155230 | A1 | | 6/2012 | Patt | |

FOREIGN PATENT DOCUMENTS

| | | | |
|---|---|---|---|
| FR | 2 752 959 | A1 | 3/1998 |
| JP | 56-145126 | U | 11/1981 |

* cited by examiner

ELECTRONIC WATCH COMPRISING A DEWAR DEVICE

CROSS REFERENCE TO RELATED APPLICATIONS

This application is a National Stage of International Application No. PCT/EP2020/085357, filed Dec. 9, 2020, claiming priority to European Patent Application No. 19214449.1, filed Dec. 9, 2019.

TECHNICAL FIELD

The invention relates to an electronic watch comprising a Dewar device, such a watch being particularly adapted to function at extreme temperatures. Such an electronic watch is for example a quartz watch.

TECHNOLOGICAL BACKGROUND

An electronic watch conventionally comprises a bracelet and a watch case including several electrical or electronic components. It is known in the prior art that some of these components cannot withstand extreme temperatures, and stop functioning correctly at these temperatures. Typically, LCD (Liquid Crystal Display) screens use light-emitting diodes or quartzes tolerate temperatures not exceeding approximately 80° C. (degrees Celsius), and do not fall below 0° C. However, in specific environments such as for example space or moon missions, the temperatures can frequently attain values of the order of substantially −150° C. to +125° C.

There is therefore a need to be able to have an electronic watch equipped with a watch case including one or more electronic components, and capable of withstanding such extreme temperatures while functioning nominally.

SUMMARY OF THE INVENTION

To this end, the invention relates to an electronic watch comprising a bracelet and a watch case including at least one electrical or electronic component, said watch comprising at least one Dewar device configured to contain at least one of said electrical or electronic components, said at least one Dewar device including inner and outer walls and a vacuum or quasi-vacuum space defined between these said walls, the inner wall delimiting a volume wherein said at least one electrical or electronic component may be arranged.

Thanks to the presence in the watch case of at least one Dewar device which encapsulates the electrical or electronic components of the watch, the latter are protected from any extreme outside temperatures that can be between −150 and +125 degrees Celsius. Such a watch configuration thus makes it possible to use standard electrical or electronic components in contexts and environments where the temperatures can be extreme, such as for example space or moon missions. This thus helps rationalize costs and retain reasonable complexity for the components used in the watch for such missions.

In further embodiments:

- the watch case comprises an enclosure wherein at least one Dewar device containing at least one of said electrical or electronic components is comprised;
- the Dewar device is formed fully or partially by the watch case and contains at least one of said electrical or electronic components;

- the Dewar device comprises the following parts of the watch case delimiting said volume: a middle, a crystal and a back;
- the middle and the back of the case forms a one-piece part, said part defining an opening opposite the back which may be closed by the crystal of said watch particularly removably;
- the middle and the crystal of the watch case forms a one-piece part, said part defining an opening opposite the crystal which may be closed by the back of said watch particularly removably;
- the Dewar device comprises two thin inner and outer walls imbricated in one another, the inner wall delimiting the volume inside which the or each electrical or electronic component is arranged, the outer wall which is arranged on the outside of the watch, the vacuum or quasi-vacuum space separating the inner wall from the outer wall;
- said at least one electrical or electronic component is selected from the group consisting of: a display device, a processor, a memory, a power storage component, a motor, an integrated circuit and an electronic oscillator, and
- the watch comprises an enclosure wherein at least one Dewar device containing at least one electrical or electronic component is arranged;
- the watch is a quartz watch.

BRIEF DESCRIPTION OF THE FIGURES

Further specificities and advantages will emerge clearly from the description given hereinafter, which is by way of indication and in no way limiting, with reference to the appended figures, wherein.

DETAILED DESCRIPTION OF THE INVENTION

Figure 1:
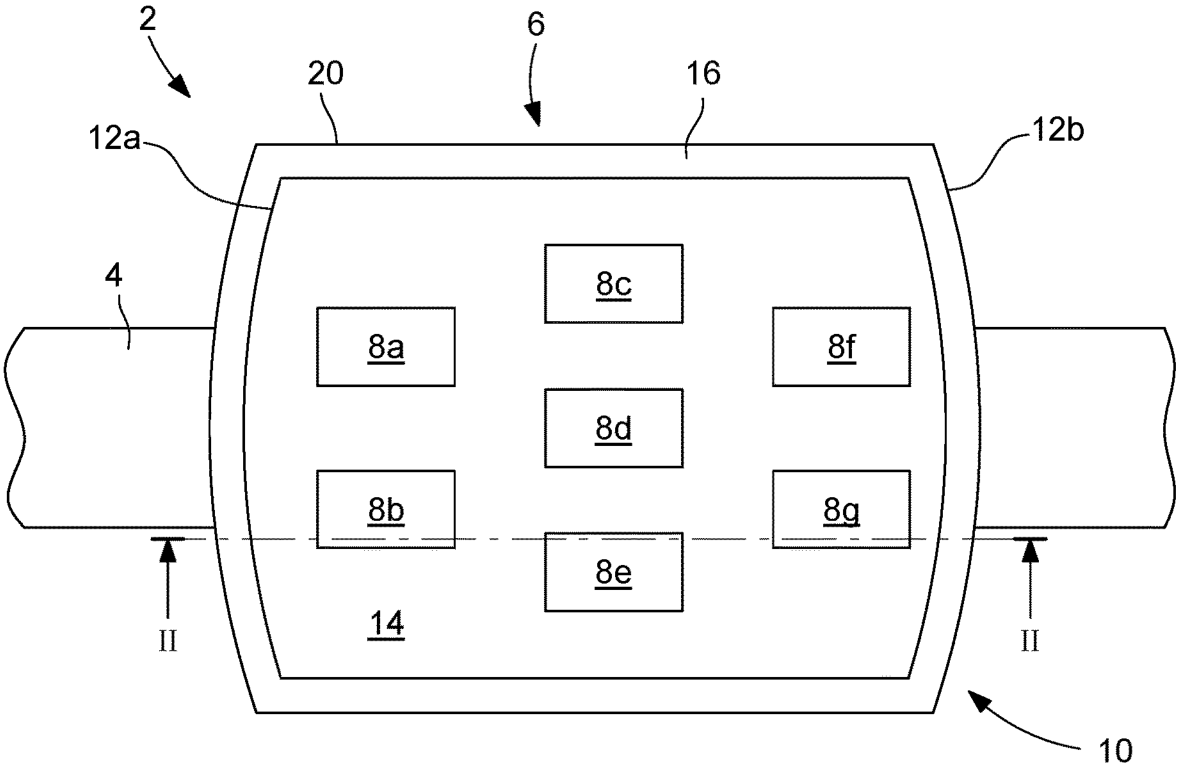
FIG. 1 is a schematic representation of a top view of a first alternative embodiment of the electronic watch of which a case is formed fully or partially by a Dewar device, according to an embodiment of the invention.
Figure 2:
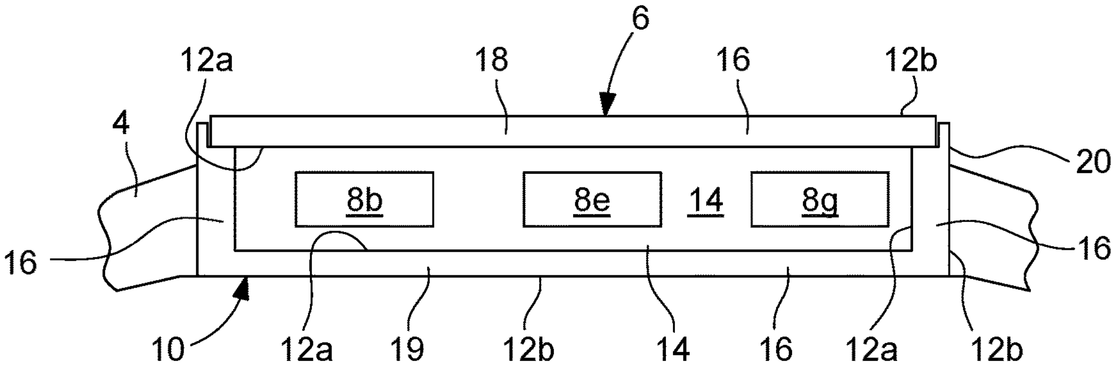
FIG. 2 is a sectional view along the axis II-II of the schematic representation of the schematic representation of the first alternative embodiment of the electronic watch illustrated in FIG. 1, according to the embodiment of the invention.
Figure 3:
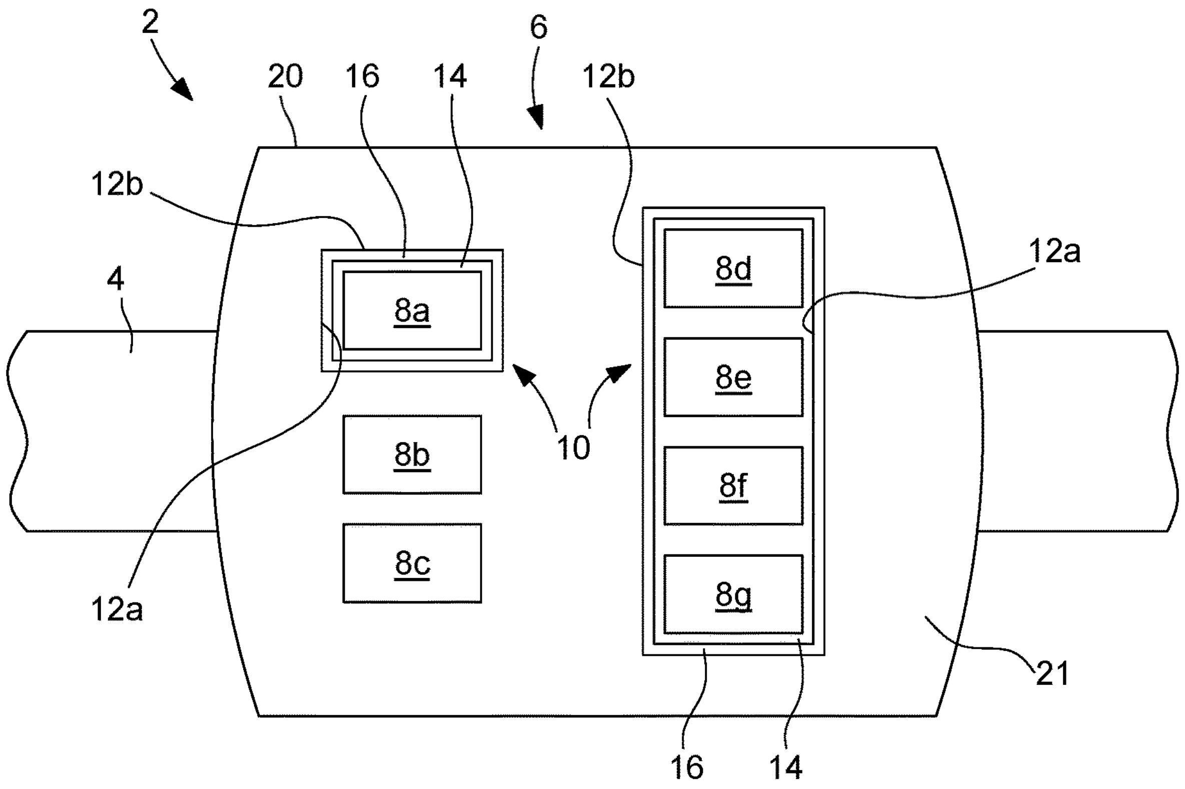
FIG. 3 is a schematic representation of a top view of a second alternative embodiment of the electronic watch of which the case comprises an enclosure wherein at least one Dewar device capable of containing at least one electrical or electronic component of said watch, according to an embodiment of the invention.

FIGS. 1 to 3 represent an electronic watch 2 according to the invention. The electronic watch 2 comprises a bracelet 4 and a watch case 6. Without being restrictive within the scope of the present invention, the electronic watch 2 is for example a quartz watch.

The watch case 6 conventionally includes at least one electrical or electronic component 8*a*-8*g*. In specific alternative embodiments of the watch illustrated in FIGS. 1 to 3, the watch case 6 includes seven electrical or electronic components 8*a*-8*g*, which form sensitive parts of the watch 2. Obviously, the watch case 6 can include more electrical or electronic components than those represented in these figures, or can only include one subset of components from the components 8*a*-8*g*. In these alternative embodiments, the watch case 6 thus includes for example a display device 8*a*, a processor 8*b*, a memory 8*c*, a power storage component 8*d*, a motor 8*e*, an integrated circuit 8*f* and an electronic oscillator 8*g*.

In these different alternative embodiments illustrated in FIGS. 1 to 3, the watch case 6 further includes at least one Dewar device 10. This Dewar device 10 has the same properties and features as a Dewar tube/vessel well-known in the prior art. As will be seen hereinafter, the properties and features of this Dewar device 10 help give it a good thermal insulation in relation to temperatures that can prevail in the external environment wherein it can be located. This device comprises a confinement/encapsulation space 14 which is here a volume 14 defined inside this device 10 and which is provided to receive at least one of said electrical or electronic components 8*a*-8*g* so that it is thermally insulated from the external environment. This volume 14 is also referred to as the confinement/encapsulation volume 14.

In the first alternative embodiment of this watch, represented in FIGS. 1 and 2, the watch case 6 therefore includes this Dewar device 10. More specifically, this Dewar device 10 is formed fully or partially by the watch case 6. Such a Dewar device 10 is pre-configured to contain at least one of said electrical or electronic components 8*a*-8*g*. In other words, this device 10 comprises the space 14, or the volume 14, wherein each component can be arranged by being encapsulated in this space 14.

In a first alternative of this first alternative embodiment visible in FIGS. 1 and 2, the Dewar device 10 can contain all of the electrical or electronic components 8*a*-8*g* of the watch 2. In this context, this Dewar device 10 is then formed by parts of the watch case 6 such as a middle 20, a crystal 18 and a back 19. The assembly of these parts helps create the confinement space 14, or confinement volume 14, of this Dewar device 10 provided for the arrangement of the components 8*a*-8*g*. These three parts, the middle 20, the crystal 18 and the back 19 can be separate parts and joined together subsequently to build this encapsulation space 14, or encapsulation volume 14. Alternatively, the middle 20 and the back 19 of the case can form a one-piece part seen in FIG. 2 together, said one-piece part defining an opening opposite the back 19 which may be closed by the crystal 18 of said watch removably. Also alternatively, the middle 20 and the crystal 18 of the watch case 6 can form a one-piece part together, said one-piece part defining an opening opposite the crystal 18 which may be closed by the back 19 of said watch, also removably. In these configurations, the space 14, or the volume 14, is formed between these three parts. In this first alternative seen in FIGS. 1 and 2, this Dewar device 10 includes the inner wall formed by internal walls of the crystal 18, the back 19 and the middle 20, and the outer wall 12*b* formed by external walls of this crystal 18, this back 19 and this middle 20. These inner and outer walls 12*a*, 12*b* are separated by the vacuum or quasi-vacuum space 16. Furthermore, this inner wall 12*a* delimits the volume 14 wherein the electrical or electronic components 8*a*-8*g* may be arranged.

In a second alternative of this first alternative embodiment, not shown in the figures, the Dewar device 10 contains at least one of the electrical or electronic components 8*a*-8*g* of the watch. In this context, this Dewar device 10 is then formed by at least two parts which are capable of cooperating together while being assembled together to form this device 10. Such parts comprise a part for partitioning the watch case 6 which can have a specific shape in order to simultaneously:

- define by cooperating with at least another part of the watch case 6, a confinement or encapsulation space 14 also referred to as confinement or encapsulation volume, which accounts for the volume which may be occupied by the component(s) 8*a*-8*g*, and
- be able to be assembled with at least one other part of the watch case 6, such as all or part of the internal wall of the middle 20 of this case 6, or all or part of the internal wall of the back 19 or with the internal walls of this back 19 and this middle 20.

In this second alternative, this Dewar device 10 has an inner wall 12*a* which is formed by an internal wall of at least one other part of the watch case 6 (the crystal 18, the back 19 or the middle 20) and an internal wall of the partitioning part, and the outer wall 12*b* is formed for its part by an external wall of at least one other part (the crystal 18, the back 19 or the middle 20) and an external wall of the partitioning part. In this alternative also, these inner and outer walls 12*a*, 12*b* are separated by the vacuum or quasi-vacuum space 16. Furthermore, this inner wall 12*a* delimits the volume 14 wherein the component(s) 8*a*-8*g* may be arranged.

In a second alternative embodiment of the watch illustrated in FIG. 3, the watch case 6 comprises an enclosure 21 conventionally including the watch movement and which is delimited particularly by the internal walls of the middle 20 and the back 19. Such an enclosure 21 also includes at least one Dewar device 10 containing at least one of said electrical or electronic components 8*a*-8*g*. This Dewar device 10 can contain/encapsulate a single component or several components at the same time. This Dewar device 10 can be integrated in the movement of the watch 2. In this alternative embodiment, each Dewar device 10 arranged in the enclosure 21 of this watch case comprises the inner 12*a* and outer 12*b* walls which are separated by the vacuum or quasi-vacuum space 16. In this configuration, this inner wall 12*a* delimits the volume 14 wherein the component(s) 8*a*-8*g* may be arranged. Furthermore, in this alternative, several Dewar devices encapsulating one or more components 8*a*-8*g*, can be disposed in the enclosure of the watch case.

In these alternative embodiments, the Dewar device 10 can typically comprise two thin inner and outer walls 12*a*, 12*b* imbricated in one another. An inner wall 12*a* of the device 10 delimits the confinement/encapsulation space 14 (or confinement/encapsulation volume 14) inside which each electrical or electronic component 8*a*-8*g* is arranged. An outer wall 12*b* of the device 10 which according to the alternative embodiments can be arranged on the outside of the watch 2, or on the outside of the watch 2 and in the enclosure of the watch case. The Dewar device 10 thus defines an empty or quasi-empty space 16 which separates the first inner wall 12*a* from the second outer wall 12*b*. It is clearly understood here that this space 16 is hermetically sealed and that it is in a vacuum or quasi-vacuum. These walls 12*a*, 12*b* are preferably made in a non-limiting and non-exhaustive manner from a metallic material, from glass or from thermosetting or thermoplastic carbon or glass fibres or from ceramic materials.

It will be noted that when the inner and outer walls 12*a*, 12*b* are transparent or semi-transparent while being for example made from glass, the external surface of this inner wall 12*a* and the internal surface of this outer wall 12*b* are coated with a metallic or similar reflective coating, such as for example a coat of silver.

In this watch 2, the crystal 18 of the watch case 6 is formed from a transparent or semi-transparent sheet of glass. When this crystal 18 is comprised in the Dewar device 10, i.e. it contributes to the formation of this device 10, it then comprises internal and external walls which are also respectively inner and outer walls 12*a*, 12*b* of the Dewar device 10 between which walls 12*a*, 12*b* the empty (or vacuum) space or quasi-empty (or quasi-vacuum) space 16 is defined.

In the first alternative embodiment, when the partitioning part of the watch case 6, the middle, the crystal and the bottom help form the Dewar device, then the internal and external walls of this partitioning part, this middle 20, the crystal 18 and the back 19 are also the inner and outer walls 12*a*, 12*b* of the Dewar device 10 of this watch 2. It is therefore understood that these internal and external walls of the partitioning part, the middle 20, the crystal 18 and the back 19 then help form together the inner and outer walls 12*a*, 12*b* of the Dewar device 10.

Such a Dewar device 10 thus provides the watch 2 with very good thermal insulation with respect to the external environment by reducing or even preventing a heat loss from the encapsulation volume 14 by radiation. Thus, when the temperature outside the watch 2 attains extreme values, typically of the order of −125 to +125° C., the temperature inside the encapsulation space 14 (or encapsulation volume 14) remains for its part substantially equal to the temperature of the ambient medium wherein the encapsulation was performed, typically of the order of 20° C. It is thus understood that such a configuration makes it possible to protect the electrical or electronic components 8*a*-8*g* of the watch 2, and thus enable the operation thereof under extreme external temperature conditions.

The invention claimed is:

1. An electronic watch (2) comprising a bracelet (4), a watch case (6), and at least one electrical or electronic component (8*a*-8*g*), said watch (2) further comprising at least one Dewar device (10) in which at least one of said electrical or electronic components (8*a*-8*g*) is contained, said at least one Dewar device (10) including inner and outer walls (12*a*, 12*b*) and a vacuum space (16) between these said walls (12*a*, 12*b*), the inner wall (12*a*) delimiting a volume (14), within the case and separate from the vacuum space (16), wherein said at least one electrical or electronic component (8*a*-8*g*) is arranged in the volume (14), and the volume (14) is separated from the vacuum space (16) by at least the inner wall (12*a*).

2. The electronic watch (2) according to claim 1, wherein the watch case (6) comprises an enclosure (21) wherein said at least one Dewar device (10) containing at least one of said electrical or electronic components (8*a*-8*g*) is comprised.

3. The electronic watch (2) according to claim 1, wherein the Dewar device (10) is formed fully or partially by the watch case (6) and contains at least one of said electrical or electronic components (8*a*-8*g*).

4. The electronic watch (2) according to claim 1, wherein the Dewar device (10) comprises the following parts of the watch case (6) delimiting said volume (14): a middle (20), a crystal (18) and a back (19).

5. The electronic watch (2) according to claim 1, wherein the middle (20) and the back (19) of the case forms a one-piece part, said part defining an opening opposite the back (19) which is closed by the crystal (18) of said watch particularly removably.

6. The electronic watch (2) according to claim 1, wherein the Dewar device (10) comprises the following parts of the watch case (6) delimiting said volume (14): a middle (20), a crystal (18) and a back (19), said middle (20) and said crystal (18) of the watch case (6) forms a one-piece part, said part defining an opening opposite the crystal (18) which is closed by the back (19) of said watch (2) particularly removably.

7. The electronic watch (2) according to claim 1, wherein the Dewar device (10) comprises two thin inner and outer walls (12*a*, 12*b*) imbricated in one another, the inner wall (12*a*) delimiting the volume (14) inside which the or each electrical or electronic component (8*a*-8*g*) is arranged, the outer wall (12*b*) which is arranged on the outside of the watch (2), the vacuum space (16) separating the inner wall (12*a*) from the outer wall (12*b*).

8. The electronic watch (2) according to claim 1, wherein said at least one electrical or electronic component (8*a*-8*g*) is selected from the group consisting of: a display device, a processor, a memory, a power storage component, a motor, an integrated circuit and an electronic oscillator.

9. The electronic watch (2) according to claim 1, further comprising an enclosure wherein at least one Dewar device (10) containing at least one electrical or electronic component (8*a*-8*g*) is arranged.

10. The electronic watch (2) according to claim 1, wherein the watch (2) is a quartz watch.

11. The electronic watch (2) according to claim 4, wherein at least one of the middle (20), the crystal (18) and the back (19) comprise the inner wall (12*a*) and the outer wall (12*b*).

12. The electronic watch (2) according to claim 11, further comprising a plurality of electrical or electronic components, other than the at least one electrical or electronic component (8*a*-8*g*), within said volume (14) delimited by the middle (20), the crystal (18) and the back (19).

* * * * *